June 6, 1967 R. P. HEINTZ 3,323,726
INJECTOR VALVE

Filed April 22, 1965 2 Sheets-Sheet 2

INVENTOR.
RICHARD P. HEINTZ
BY
ATTORNEY

United States Patent Office

3,323,726
Patented June 6, 1967

3,323,726
INJECTOR VALVE
Richard P. Heintz, Kalamazoo, Mich., assignor to Pneumo Dynamics Corporation, Cleveland, Ohio, a corporation of Delaware
Filed Apr. 22, 1965, Ser. No. 450,060
5 Claims. (Cl. 239—533)

The present invention relates to an improved fuel injector valve for injecting fuel into the combustion chamber of internal combustion engines and the like.

Present fuel injector valves of the type here concerned normally employ relatively slidable or movable valve components which require manufacturing to rather close tolerances to satisfactorily provide controlled movement between such components. As a result, not only are manufacturing costs relatively high, but valve malfunction frequently occurs as a result of improper seating of the relatively movable components due, by way of example, to contaminants in the fuel delivered to the valve interior.

An object of the present invention is to provide an injector valve which is not dependent upon close tolerances in the relatively movable components thereof thereby substantially reducing the cost of manufacture of the valve as well as reducing the likelihood of malfunctioning. More specifically, in accordance with the present invention, rather wide tolerances are permitted, with the movable valve poppet, nevertheless, being accurately aligned and seated during valve operation.

A further, more specific object of the present invention is to realize such poppet alignment by providing a sleeve telescopically disposed around the adjacent, trailing end of the poppet, such sleeve simultaneously supporting and aligning the poppet end for axial movement and forming an annulus with the periphery of the poppet through which fuel is supplied to the accumulating chamber during recharging.

A further object of the present invention is to provide an injector valve particularly well adapted to handle relatively variable fuel flow rates.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
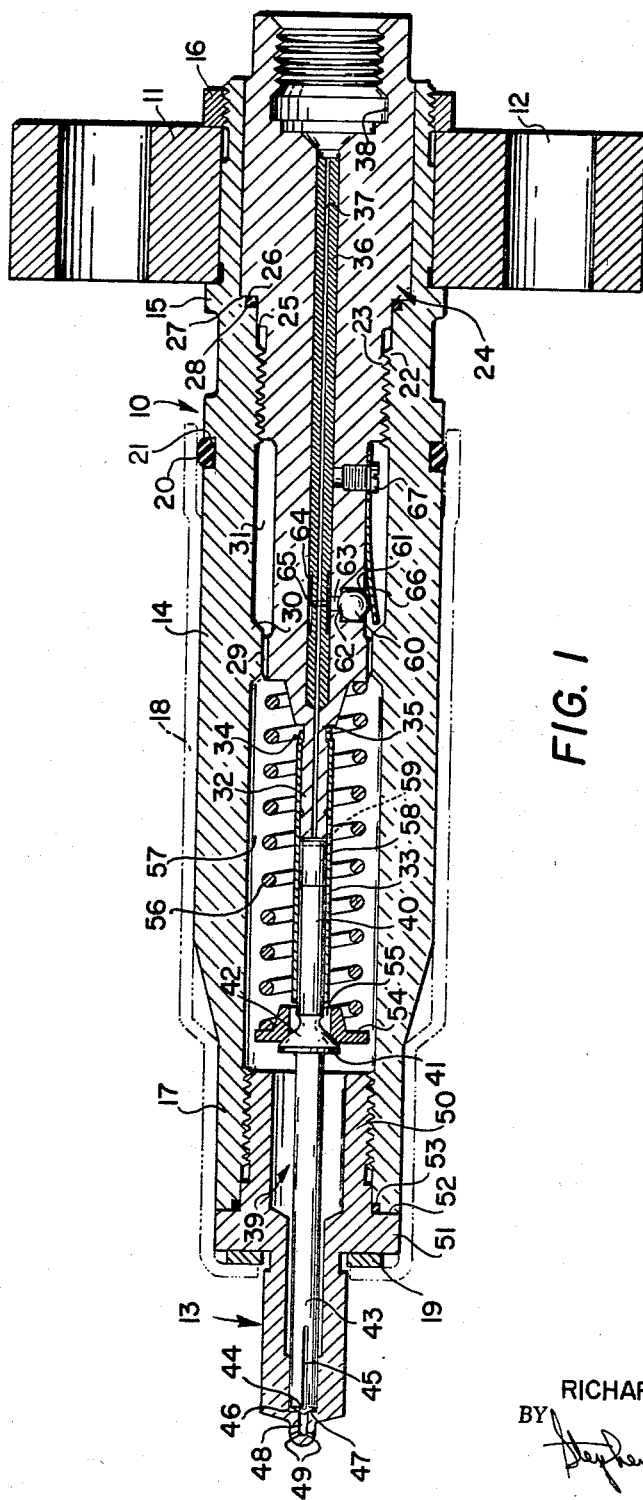
FIG. 1 is a longitudinal cross-sectional view of the fuel injector valve of the present invention.
Figure 2:
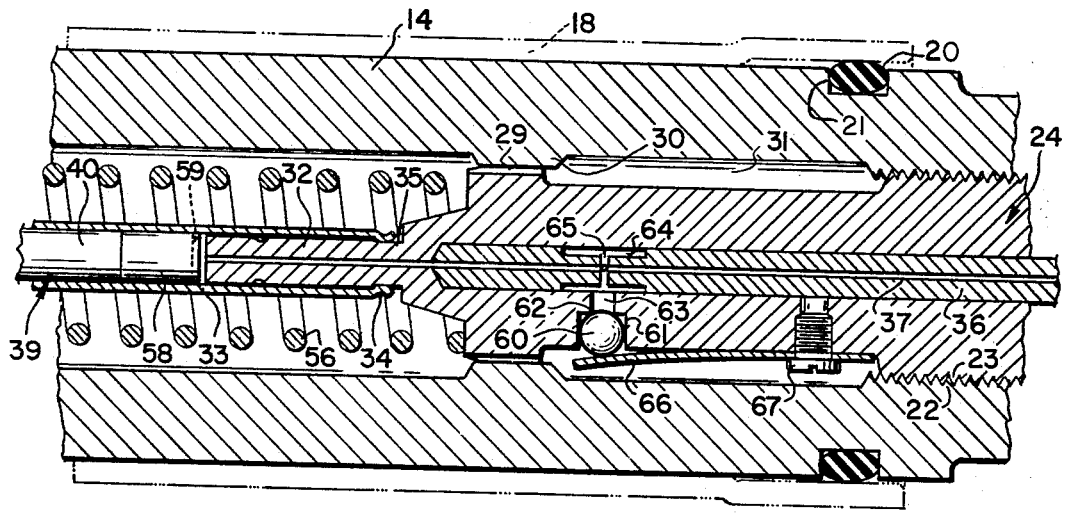
FIG. 2 is an enlarged fragmentary view of a portion of FIG. 1, more clearly showing the trailing end of the poppet and the sleeve encircling and supporting the same.

Referring now in detail to the drawings, wherein like parts are designated by like reference numerals, and initially to FIG. 1, the injector valve of the present invention is generally indicated at 10. A mounting flange 11 is mounted at one end of the valve for mounting the same on the cylinder head of an internal combustion engine, with the flange 11 being formed with a plurality of openings commonly designated at 12 through which mounting bolts (not shown) may extend for mounting the valve. The forward end of the valve mounts a nozzle generally indicated at 13 which extends into the combustion chamber of the cylinder for injecting fuel thereinto.

The valve 10 comprises an elongated body 14 having an annular shoulder 15 relatively adjacent the outer end thereof for receiving the mounting flange 11, with a jam nut 16 being threaded exteriorly on the end of the body for securing the mounting flange thereto. The valve body 14 further includes a reduced forward end portion 17 which is internally threaded for receiving the nozzle 13. A shielding jacket 18, shown in dashed lines in FIG. 1, is adapted to slip over the valve body 14 to protect the same from the cooling system liquid flowing through the engine cooling passages through which the injector valve extends. A sealing gasket 19 is provided for sealing the opening formed in the jacket through which the nozzle 13 protrudes. An O-ring 20 is mounted in an annular groove 21 formed in the periphery of the valve body for sealing the shielding jacket adjacent the open end thereof.

The valve body 14 is longitudinally bored and internally threaded as indicated at 22 relatively adjacent the mounted end thereof for receiving a threaded intermediate section 23 of a retainer sleeve member generally indicated at 24. The retainer sleeve 24 is diametrically stepped outwardly of the threaded section 23 as indicated at 25 and 26, the latter providing an annular shoulder adapted to engage an annular face 27 formed in the valve body for axially positioning the retainer sleeve therein, with an O-ring 28 being disposed in an annular recess formed in the face 27 for sealing the mounting.

The retainer sleeve 24 is formed relatively adjacent the forward end thereof with a plurality of radially directed, arcuately spaced shoulders commonly designated at 29 the outer ends of which terminate closely adjacent an inwardly directed annular shoulder 30 formed on the valve body. The shoulders 29 function to axially align the retainer sleeve within the valve body and additionally permit flow of the fuel, between the spaced shoulders, into an annular section 31 of the accumulator chamber.

The forward end 32 of the retainer sleeve 24 is of substantially reduced diameter and is adapted to receive thereover one end of a metallic sleeve 33. The sleeve is preferably adhesively secured to the retainer sleeve, and in the form shown the trailing end of the sleeve is flanged as indicated at 34 to resiliently engage a recessed surface 35 formed in the retainer sleeve.

The retainer sleeve is axially bored for receiving a tubular member 36 which can be secured in place in any suitable manner. The tubular member 36 in turn receives a flexible metallic fuel supply tube 37 through which fuel is directed to the valve interior. The outer end of the tube 37 communicates with an inlet opening 38 formed in the retainer sleeve for receiving an inlet adapter (not shown) which suitably couples the valve to the fuel line leading from a control valve, for example, of the fuel injection system. The forward end of the fuel supply tube 37 extends through and is preferably cemented in the forward end 32 of the retainer sleeve, whereby fuel is supplied to the forward end of the retainer sleeve.

A poppet generally indicated at 39 is mounted within the valve body for controlling the fuel injection. The poppet 39 includes a rear end section 40 which is received for movement within and supported by the forward end of the sleeve 33. The poppet 39 further includes an intermediate, enlarged section 41 having a curved rear surface 42, and a leading end portion 43 terminating in a conical shaped tip 44. A plurality of axially extending grooves 45, only one of which is visible in FIG. 1, are formed in the leading end of the poppet to facilitate fuel flow to the region in the nozzle adjacent the tip 44 of the poppet. The leading end of the poppet is loosely received within opening 46 formed in the nozzle 13. The tip 44 of the nozzle is adapted to seat on an annular edge 47 formed in the nozzle, which edge defines one end of an axial passage 48 the opposite end of which communicates with a plurality of injector openings or orifices commonly designated at 49.

The nozzle 13 further includes an inner, exteriorly threaded portion 50 adapted to engage the internally threaded forward end portion 17 of the valve body 14, with the nozzle 13 being formed with an annular shoulder 51 adapted to engage the leading face 52 of the forward end portion 17 of the body to properly position the nozzle. The nozzle can thus be quickly removed or mounted on the valve body. An O-ring 53 is provided to seal the connection.

The curved face 42 of the intermediate section 51 of the poppet is adapted to receive a spring retaining member 54 provided with a central opening 55 of a diameter to permit axial movement of the retaining member over the sleeve 33. A helical compression spring 56 engages at one end of the spring retaining member 54 and at its other end the retainer sleeve 24 in the area thereof immediately forward of the shoulders 29. The spring 56 urges the poppet 39 to a closed position wherein the conical tip 44 of the poppet engages the annular seat 47 of the nozzle, with the spring being compressed during fuel injection, as will be hereinafter described.

An important feature of the present invention is the avoidance of close tolerances in the relatively movable valve components performing the valving function. The forward end 43 of the poppet is loosely received in the nozzle and the opposite end 40 thereof is received within the sleeve 33, with the latter thus supporting a substantial length of the poppet. The clearance between the end of the poppet and the sleeve 33 provides an annulus through which the fuel at control line pressure can pass for delivery to the main section 57 of the accumulator chamber. The described components can thus be manufactured at relatively low costs, with the sleeve 33 preferably being formed by a simple drawing process which provides uniformity from one sleeve to the next. Thus, no expensive machining is required.

It should further be noted that the mounting of the rear end of the poppet by the sleeve 33 permits the poppet to be generally axially aligned with the nozzle 47. During assembly of the components, a suitable adhesive, for example epoxy cement, is applied to the clearance area between the sleeve 33 and the forward end 32 of the retainer sleeve, which clearance area is relatively large compared to the annulus between the sleeve and the poppet. The conical end 44 of the poppet is then seated on the annular edge 47 of the nozzle 13. The epoxy is allowed to cure so that the poppet and the forward end of the sleeve are permitted to seek their natural alignment generally coaxial with the annular seat 47, with the uncured epoxy permitting movement of the sleeve to the degree required to realize such alignment. During valve operation, the conical end 44 will naturally hunt for proper seating on the annular edge 47 and any lateral movement of the poppet 39 is effectively absorbed by the sleeve 33, which is of relatively thin-walled construction and capable of flexing to the degree necessary without imposing undue forces thereon.

To control the rearward movement of the poppet 39 during the injection period, a spacer 58 is positioned within the sleeve 33 at the rear end of the poppet, with the rear edge of the spacer 58 contacting the forward face of the retainer sleeve during injection thereby to limit poppet movement. To avoid sealing at the contact interface during injection, a slot 59 is preferably formed in the rear face of the spacer.

Fuel at normal flow rates and delivery speeds can be satisfactorily delivered to the accumulator chamber through the annulus between the poppet and the sleeve. However, in the form shown, means are provided for handling flow rates which are in excess of those satisfactorily accommodated through such annulus. A ball check valve 60 is provided for by-passing at least a portion of the fuel directly into the accumulator chamber. The ball 60 is disposed in a recess 61 formed in the retainer sleeves and is adapted to seat on an annular edge 62 which forms the outer end of a transverse passage 63. The tubular member 36 mounted within the retainer sleeve is formed with an annular recess 64 which longitudinally overlaps the passage 63 and a plurality of radial passages commonly indicated at 65 which intercommunicate the recess 64 with the fuel supply tube 37. The latter is similarly formed with a plurality of openings which are generally aligned with the radial openings 65 whereby fuel can pass from the supply tube 37 to the passage 63 for contacting the ball 60 and, under certain conditions to be presently explained, unseat the ball for fuel delivery directly to the accumulator chamber. A leaf spring 66 is mounted on the retainer sleeve by means of a suitable fastener 67, with the free end of the leaf spring engaging the outer surface of the ball 60 and urging the same to a seated position on the annular edge 62.

Where the rate of flow of the fuel through the tube 37 is such that the annulus between the sleeve and the poppet cannot handle the same, fuel will be by-passed through the ball check valve, with the force of the fuel at charging or control line pressure unseating the ball against bias of the leaf spring 66.

The manner in which the injector valve above described operates is as follows. Assuming injection has just taken place, the conical end 44 of the poppet is seated on the annular edge 47 of the nozzle 13 under the bias of the helical compression spring 56. Fuel directed to the injector valve through the tube 37 emanates from the forward end thereof and flows through the annulus between the poppet end and the sleeve into the accumulator chamber outwardly of the poppet, the sleeve 33 and the retainer sleeve 24. The fuel is delivered to the injector valve at pressures ranging from approximately 10,000 p.s.i. to 40,000 p.s.i.; and where the fuel flow rates are not relatively great, the fuel delivery to the accumulator chamber will be entirely through the noted annulus, with the accumulator chamber eventually becoming filled or charged with fuel at control line pressure. The areas on the poppet exposed respectively to accumulator pressure and control line pressure are such that the poppet remains seated during the charging.

Fuel is injected from the valve in a controlled manner by a control valve or the like which functions to cut off the fuel supply to the supply tube 37 thereby producing a drop in control line pressure. The accumulator pressure acting on the poppet produces a force which eventually overcomes the force acting against the opposite end of the poppet as the control line pressure drops, at which time the poppet is moved rearwardly against the bias of the spring 56 to permit injection of the fuel outwardly through the passage 48 and the injector openings 49. The rearward movement of the poppet is limited by the spacer 58 as above noted.

Simultaneous with the injection of fuel from the accumulator chamber through the injector openings 49, the pressure within the chamber progressively drops owing to the expansion of the fuel remaining therein. The force acting on the poppet to maintain the same unseated eventually becomes less than the force of the spring 56, whereupon the poppet is forced by the spring to a closed position thereby terminating fuel injection and completing the cycle.

The quantity of fuel delivered by the valve during the injection period is dependent upon the pressure attained in the accumulator chamber just prior to injection and the force of the compression spring 56 which controls the pressure in the accumulator at the termination of the injection period. The reseating of the poppet to terminate the injection period can also be controlled by reapplication of the control line pressure as regulated by the control valve. It will be understood that the usual fuel injection system comprises a plurality of injector valves of the type described, with the control valve or the like delivering fuel under pressure to the various valves in timed sequence.

Where the fuel injection system requires the controlled delivery by the injector valve of relatively greater quantities of fuel, incapable of being satisfactorily passed through the noted annulus, a portion of the fuel is by-passed from the fuel supply tube 37 through the radial passages 65, the annular recess 64 to the passage 63, with the force of the fuel at control line pressure forcing the ball 60 to an unseated position to permit fuel flow through the recess 61 into the accumulator chamber.

The force of the spring 66 is preselected to effect seating of the ball 60 during the final stages of accumulator recharging, while a significant pressure differential still remains between the control line and accumulator. The final charging of the accumulator to injection pressure, which approximates control line pressure, is thus effected entirely through the annulus between the poppet and the sleeve. The ball check valve is thereby always closed at the beginning of the injection period thereby precluding an irregular pressure drop in the accumulator chamber which might promote undesirable variations in fuel delivery.

In the operation of the injector valve at the relatively high pressures indicated, the inside of the sleeve 33 is subjected to considerable force, particularly at the beginning of the charging cycle where the difference in control line pressure and accumulator pressure is the greatest. There is thus a tendency for the sleeve to expand, particularly at the area immediately forward of the retainer sleeve. The cemented joint between the forward end 32 of the retainer sleeve and the sleeve 33 is likewise subjected to this force and there is a tendency for the joint to pull apart under such pressure, with any clearance thus established permitting undesirable flow inwardly of the sleeve to the control line. There is also a tendency for the cementing material to wash away at such pressures to form channels longitudinally through the cementing material to similarly promote the undesirable backflow of fuel from the accumulator chamber to the control line.

Figure 3:
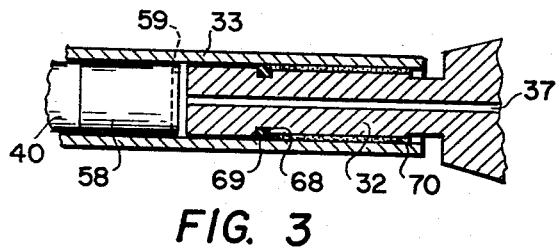
FIG. 3 is a fragmentary, enlarged view of a modified form wherein the mounting of the sleeve on the forward end of the retainer sleeve is sealed.
Figure 4:
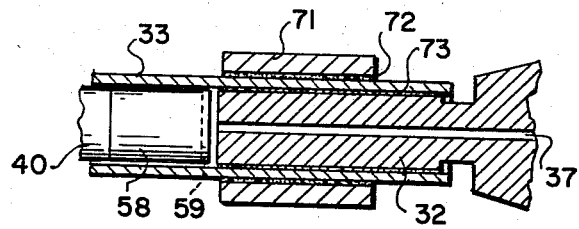
FIG. 4 is a further modified form of sleeve mounting, with a tube being provided encircling the sleeve for limiting expansion thereof.
Figure 5:
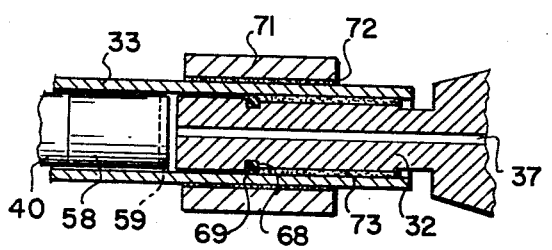
FIG. 5 is another modified form of sleeve mounting, with the mounting being sealed and a tube being provided encircling the sleeve for limiting expansion thereof.

There is shown in FIGS. 3–5 means for substantially eliminating the undesirable leakage through the cement joint between the sleeve 33 and the forward end 32 of the retainer sleeve. Referring initially to FIG. 3, the forward end 32 of the retainer sleeve is provided with an annular recess 68 adapted to receive an O-ring 69. The clearance rearwardly of the O-ring is cemented as indicated at 70. The O-ring effectively seals the clearance area and prevents the fuel at control line pressure from reaching the cement joint. The cement joint functions to prevent extrusion of the O-ring in the clearance under the relatively large forces acting in the direction of such joint.

There is illustrated in FIG. 4 means for positively limiting the expansion of the sleeve 33. A relatively thick-walled tubular member 71 is telescopically received around the sleeve 33, with a suitable cementing material 72 being applied in the clearance area for bonding the tube 71 to the periphery of the sleeve. The tube 71 thus functions to limit expansion of the sleeve under the relatively high internal pressures thereby preventing the above-noted undesirable formation of clearances or channels through the cement joint 73 between the forward end 32 of the retainer sleeve and the sleeve 33.

There is illustrated in FIG. 5 combined use of both the O-ring 69 and the relatively thick-walled tube 71 around the sleeve 33 to accomplish the purposes indicated.

The present invention thus provides an injector valve which does not require the close manufacturing tolerances usually required with valves of this general type. The poppet is supported in a novel manner and generally axially aligned with the poppet seat during assembly of the valve components to achieve accurate seating during the operating cycle. The valve is capable of handling rather wide ranges of flow rates without impairing accurate fuel injection over such range.

Other modes of applying the principle of the invention may be employed, change being made as regards the details described, provided the features stated in any of the following claims or the equivalent of such be employed.

I therefore particularly point out and distinctly claim as my invention:

1. A fuel injector valve comprising a valve body, nozzle means removably mounted on said valve body, said nozzle means providing a poppet seat and being formed with injector openings through which fuel can be expelled from said valve, a poppet within said valve body having a forward end portion adapted to engage said poppet seat, spring means biasing said poppet to a closed position, means for supplying fuel under pressure to said valve, said means for supplying fuel to said valve comprising tube means extending axially through said retainer sleeve for delivering fuel to the area forwardly thereof, said valve body defining an accumulator chamber for pressure accumulation of the fuel, a retainer sleeve mounted in said valve body generally co-axial with said poppet seat, a relatively thin-walled sleeve having a forward end telescopically disposed around the trailing end of said poppet to permit relative axial movement therebetween and an opposite end extending around and mounted to said retainer sleeve, said thin-walled sleeve supporting said poppet and defining therewith a flow annulus through which fuel can be delivered to said accumulator chamber, said supporting sleeve generally axially aligning said poppet with said poppet seat, and fuel by-pass means communicating with said tube means intermediate the ends thereof, said by-pass means communicating with said accumulator chamber for delivering fuel directly thereto.

2. The combination of claim 1 wherein said by-pass means comprises a radial passage formed in said retainer sleeve, and ball check valve means mounted in said passage for opening the same responsive to predetermined pressure conditions.

3. A fuel injector valve comprising a valve body, nozzle means removably mounted on said valve body, said nozzle means providing a poppet seat and being formed with injector openings through which fuel can be expelled from said valve, a poppet within said valve body having a forward end portion adapted to engage said poppet seat, spring means biasing said poppet to a closed position, means for supplying fuel under pressure to said valve, said valve body defining an accumulator chamber for pressure accumulation of the fuel, a retainer sleeve mounted in said valve body generally co-axial with said poppet seat, a relatively thin-walled sleeve having a forward end telescopically disposed around the trailing end of said poppet to permit relative axial movement therebetween and an opposite end extending around and mounted to said retainer sleeve, said thin-walled sleeve supporting said poppet and defining therewith a flow annulus through which fuel can be delivered to said accumulator chamber, said supporting sleeve generally axially aligning said poppet with said poppet seat, and tubular sleeve means mounted around and secured to the outer periphery of said thin-walled sleeve in the region thereof mounted on said forward end of said retainer sleeve for limiting radial expansion of said thin-walled sleeve and preventing undesirable fuel flow through the clearance in such region.

4. The combination of claim 3 further including seal means carried by said retainer sleeve and disposed in the clearance area between the same and said thin-walled sleeve to prevent fuel flow through such clearance area.

5. A fuel injector valve comprising a valve body defining an accumulator chamber, nozzle means removably mounted on said valve body, said nozzle means providing a poppet seat and being formed with injector openings through which fuel can be expelled from said valve, a poppet within said valve body having a forward end portion adapted to engage said poppet seat, spring means biasing said poppet to a closed position, a retainer sleeve mounted in said valve body generally co-axial with said poppet seat, a relatively thin-walled sleeve mounted on the forward end of said retainer sleeve and having a forward end telescopically disposed around the trailing end of said poppet to permit relative axial movement therebetween, said thin-walled sleeve supporting said poppet and defining therewith a flow annulus through which fuel can be delivered to said accumulator chamber, means for supplying fuel under pressure to said flow annulus for passage therethrough to said accumulator chamber, and by-pass means communicating with said fuel supply means in advance of said thin-walled sleeve for delivering fuel directly to said accumulator chamber and by-passing said flow annulus, said supporting sleeve generally axially aligning said poppet with said poppet seat.

References Cited

UNITED STATES PATENTS

| 1,746,856 | 2/1930 | French | 239—534 |
| 1,967,987 | 7/1934 | Broege | 239—96 |
| 2,534,874 | 12/1950 | Metter | 239—534 |
| 3,225,684 | 12/1965 | Roosa | 239—533 |

FOREIGN PATENTS

| 483,614 | 10/1929 | Germany. |
| 923,960 | 2/1955 | Germany. |

EVERETT W. KIRBY, *Primary Examiner.*